US011836532B2

United States Patent
Gosik

(10) Patent No.: US 11,836,532 B2
(45) Date of Patent: Dec. 5, 2023

(54) OS OPTIMIZED WORKFLOW ALLOCATION

(71) Applicant: HEXAGON TECHNOLOGY CENTER GMBH, Heerbrugg (CH)

(72) Inventor: Lukasz Gosik, Scheidegg (DE)

(73) Assignee: HEXAGON TECHNOLOGY CENTER GMBH, Heerbrugg (CH)

( * ) Notice: Subject to any disclaimer, the term of this patent is extended or adjusted under 35 U.S.C. 154(b) by 156 days.

(21) Appl. No.: 17/153,782

(22) Filed: Jan. 20, 2021

(65) Prior Publication Data

US 2021/0224117 A1 Jul. 22, 2021

(30) Foreign Application Priority Data

Jan. 21, 2020 (EP) .................................... 20152994

(51) Int. Cl.
| | | |
|---|---|---|
| G06F 9/46 | (2006.01) | |
| G06F 9/50 | (2006.01) | |
| G06F 16/901 | (2019.01) | |
| G06F 9/48 | (2006.01) | |
| G06F 9/54 | (2006.01) | |

(52) U.S. Cl.
CPC ............ *G06F 9/505* (2013.01); *G06F 9/4881* (2013.01); *G06F 9/546* (2013.01); *G06F 16/9024* (2019.01); *G06F 2209/547* (2013.01)

(58) Field of Classification Search
CPC ........ G06F 9/505; G06F 9/4881; G06F 9/546; G06F 2209/547; G06F 16/9024
See application file for complete search history.

(56) References Cited

U.S. PATENT DOCUMENTS

| | | | |
|---|---|---|---|
| 9,606,836 B2 | 3/2017 | Burger et al. | |
| 2011/0231849 A1 | 9/2011 | Saha et al. | |
| 2021/0208953 A1* | 7/2021 | Vasileiadis | ............ G06F 9/5083 |

FOREIGN PATENT DOCUMENTS

| | | |
|---|---|---|
| CN | 103914754 A | 7/2014 |
| CN | 106096644 A | 11/2016 |
| CN | 107710161 A | 2/2018 |

OTHER PUBLICATIONS

Gawali et al., Task scheduling and resource allocation in cloud computing using a heuristic approach, Journal of Cloud Computing: Advances, Systems and Application, 2018, 16 pages.*
Zohrati et al., Flexible approach to schedule tasks in cloud-computing environment, IET Software, May 2018, 6 pages.*
Kumar et al., "On benchmarking task scheduling algorithms for heterogeneous computing systems" Journal of Supercomputing, Apr. 7, 2018.
Anonymous "Gant Chart—Wikipedia" Nov. 29, 2019.
Tomplkins "Optimization techniques for task allocation and scheduling in distributed multi-agent operations" May 24, 2003.
Anonymous "Message broker—Wikipedia" Dec. 9, 2019.

(Continued)

*Primary Examiner* — Diem K Cao
(74) *Attorney, Agent, or Firm* — Maschoff Brennan

(57) ABSTRACT

A computer implemented method implemented on an allocation computing unit for distributing a pre-defined workflow comprising a nonempty set of workflow components, the workflow components being ordered in a directed acyclic precedence graph, onto a set of general purpose computing units comprising at least two general purpose computing units.

14 Claims, 1 Drawing Sheet

(56) References Cited

OTHER PUBLICATIONS

Anonymous "Cloud storage—Wikipedia" Jan. 16, 2019.
European Search Report dated May 28, 2020 as received in application No. 20152994.
Stonebraker, M. (1981). Operating system support for database management. Readings in Database Systems, 167.
Karlsson, J., & Eriksson, P. (2014). How the choice of Operating System can affect Databases on a Virtual Machine.

* cited by examiner

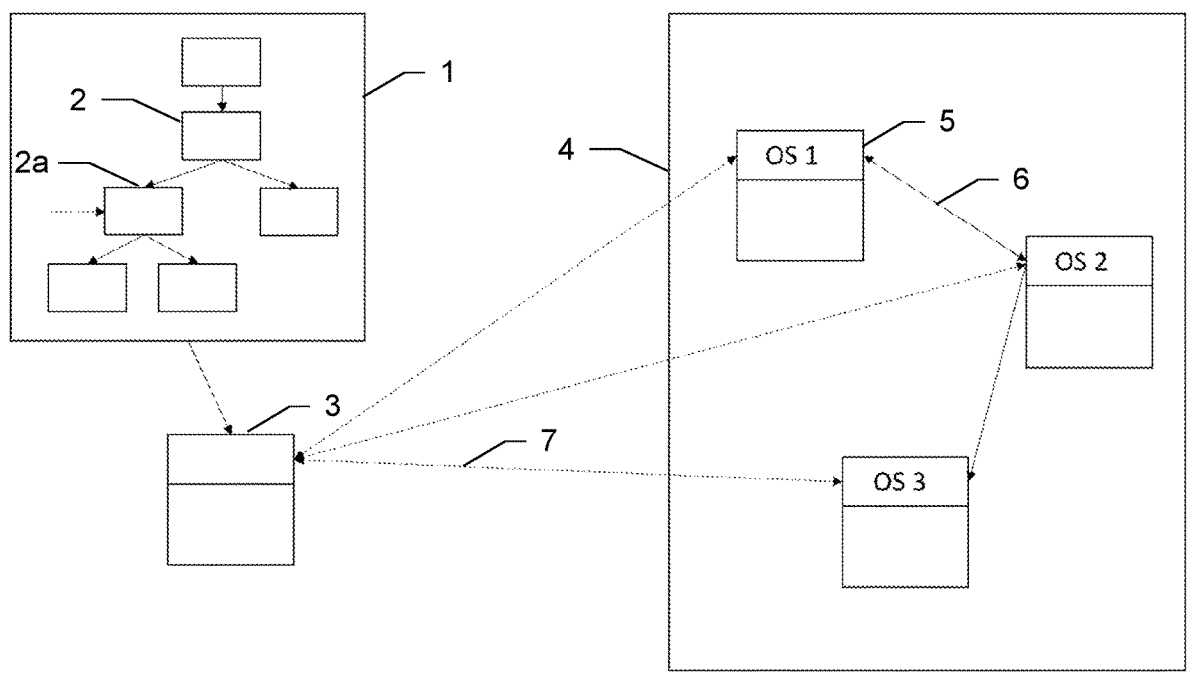

OS OPTIMIZED WORKFLOW ALLOCATION

CROSS-REFERENCE TO RELATED APPLICATIONS

This application claims priority to European Patent Application No. 201592994.8, filed on Jan. 21, 2020. The foregoing patent application is herein incorporated by reference.

FIELD OF INVENTION

The present invention relates to a computer implemented method for distributing a workflow onto a set of general purpose computing units.

BACKGROUND

Scheduling a set of tasks onto a set of computing units is a well-known problem. Operating systems provide scheduling algorithms for assigning tasks to a central processing unit for execution, for example. In case of multiple parallel computing units at disposal, more elaborate scheduling algorithms are typically required as compared to a single available computing unit.

The doctoral thesis of Tompkins (Tompkins, M. F. (2003). Optimization techniques for task allocation and scheduling in distributed multi-agent operations (Doctoral dissertation, Massachusetts Institute of Technology)) provides an optimization algorithm (mixed integer linear programming) for distributing a set of tasks onto a set of computing units, for example. The algorithm is exact in that no heuristics are used for solving the allocation problem. The algorithm provided by Tompkins assumes that each computing unit can only execute one task at a time, and once the execution of a task on a computing unit is started, it cannot be interrupted. This assumption made by Tompkins does not conform well with modern operating systems. To utilize a computing unit well, modern operating systems tend to keep several program at once in main memory.

The execution speed of tasks typically depends on the operating system which is used for providing hardware access to the tasks. For a task involving databases, for example, it is known (Stonebraker, M. (1981). Operating system support for database management. *Readings in Database Systems*, 167 and Karlsson, J., Eriksson, P. (2014). How the choice of Operating System can affect Databases on a Virtual Machine) that the choice of operating system affects the efficiency of reading and writing from a database.

If a workflow it to be executed on heterogeneous general purpose computers, an allocation algorithm should preferentially enable the parallel execution of tasks, of the workflow on single general purpose computers. Heterogeneous general purpose computers may typically also use different operating systems, wherein any change in a fundamental component of an operating system such as scheduling algorithm, memory management or input/output functionality is considered to provide a different operating system. Operating systems are tailored to a hardware configuration of a computing unit.

BRIEF SUMMARY OF THE INVENTION

It is therefore an objective of some embodiments of the present invention to provide for an allocation algorithm allocating a workflow to a set of general purpose computing units using at least two different operating systems.

This objective is achieved by realizing at least part of the features of the independent claim. Features which further develop the invention in an alternative or advantageous manner are described in the dependent patent claims.

Some aspects of the invention relate to a computer implemented method, the method implemented on an allocation computing unit, for distributing a pre-defined workflow comprising a nonempty set of workflow components, the workflow components being ordered in a directed acyclic precedence graph, onto a set of general purpose computing units comprising at least two general purpose computing units, wherein at least one workflow component requires data from sensors recording observables of at least one physical process, wherein the at least one workflow component is used for controlling and/or monitoring the at least one physical process, using as input the workflow comprising the workflow components, and a list of the nonempty set of general purpose computing units, and information about the hardware configuration of each general purpose computing unit and about the operating system running on each general purpose computing unit and about communication connections between the general purpose computing units, wherein at least two different operating systems run on the set of general purpose computing units, using an external computer program product providing static analysis technique functionality, the method using a distribution variable which comprises—for each general purpose computing unit—a list of workflow components assigned to the general purpose computing unit and the scheduled start time of the currently assigned workflow components, and using individual worst case execution times of the workflow components corresponding to the case that only an individual workflow component runs on a general purpose computing unit, wherein individual worst case execution times are provided for all combinations between individual workflow components and single computing units, wherein individual worst case execution times are provided by the external computer program product providing static analysis technique functionality, and carrying out the following steps:

1) using at least the individual worst case execution times, the directed acyclic precedence graph and the information about communication connections between the general purpose computing units as input to a first optimization algorithm, wherein the optimization is in particular embodied as a mixed integer linear program, the optimization algorithm providing for each workflow component a general purpose computing unit and a scheduled time at which computation on the general purpose computing unit starts, and
2) starting with a first leaf of the directed acyclic precedence graph, finding all nodes in the directed acyclic precedence graph with a directed path to the first leaf, and updating the distribution variable with the workflow components corresponding to the identified nodes linked to the general purpose computing units determined in the previous step and by registering the scheduled times, and removing the identified nodes and all edges connected to the identified nodes from the directed acyclic precedence graph, and
3) estimating time-dependent worst-case execution times of the remaining workflow components on the general purpose computing units, in particular by using the individual worst case execution times and knowledge about the operating system running on the general purpose computing units and the distribution variable, and 4) providing at least the cropped directed acyclic precedence graph, the time-dependent worst-case execution times and the information about communication connections between the general purpose computing units as input to a second optimization algorithm, wherein the second optimization algorithm is further constrained in that—provided a workflow component remaining in the cropped directed acyclic precedence graph possesses a directed path in the original directed acyclic precedence graph from a removed node to the node corresponding to the workflow component—the workflow component is only scheduled after completion of all already assigned workflow components having a directed path to the workflow component, wherein the second optimization algorithm provides for each remaining workflow component a general purpose computing unit and a scheduled time at which computation on the general purpose computing unit starts, and 5) starting with a subsequent leaf of the cropped directed acyclic precedence graph, finding all nodes in the cropped directed acyclic precedence graph with a directed path to the subsequent leaf, and updating the distribution variable with the workflow components corresponding to the identified nodes linked to the general purpose computing units determined in the previous step and by registering the scheduled times, and removing the identified nodes and all edges connected to the identified nodes from the directed acyclic precedence graph, and 6) continue with step 3) until the cropped directed acyclic precedence graph is empty, and 7) using the distribution variable, executing the workflow components on the general purpose computing units at the scheduled times.

A distribution of workflow components onto general purpose computing using the computer implemented method according to the invention allows for parallel execution of workflow components on individual computing units and also lowers the overall makespan of the workflow. The distribution method takes into account the hardware configuration of the computing units as well as the operating systems running on the computing units as well as the available communication connections between computing units. Different hardware configurations are reflected in the worst case execution times, since static analysis software analyzes the execution of a workflow component on a computing unit for which the workflow component is compiled.

In an embodiment of the computer implemented method according to some aspects of the invention, the method is characterized by modifying the individual worst case execution time of a workflow component on a general purpose computing unit using the information about the number of workflow components already residing in main memory of the general purpose computing unit and the scheduling algorithm of the operating system running on the general purpose computing unit, and multiplying for a round robin scheduling algorithm in particular the individual worst case execution time with the number of workflow components already residing in main memory of the general purpose computing unit to obtain a worst case execution time.

In another embodiment of the computer implemented method according to some aspects of the invention, the first and second optimization algorithms take into account which of the general purpose computing units are optimized for input/output bound workflow components and which of the general purpose computing units are optimized for CPU bound workflow components, wherein the worst case execution time of a CPU bound workflow component is typically e.g. larger on a general purpose computing unit with operating system preferring input/output bound workflow components than on a general purpose computing unit with operating system preferring CPU bound workflow components.

In another embodiment of the computer implemented method according to some aspects of the invention, the first and second optimization algorithms take into account the physical availability of sensor data provided by sensors recording observables of the at least one physical process, wherein the at least one workflow component requiring sensor data is used for controlling and/or monitoring the at least one physical process, wherein the at least one workflow component is allocated to a general purpose computing unit at the earliest after the sensor data become available.

In another embodiment of the computer implemented method according to some aspects of the invention, the first and/or second optimization algorithm is embodied as a mixed integer linear programs, wherein the first and/or second optimization algorithm is configured to minimize the makespan of workflow provided as input.

In another embodiment of the computer implemented method according to the invention, the first and/or second optimization algorithm is embodied as an algorithm implementing a dynamic programming principle, or as a greedy algorithm distributing workflow components in a greedy fashion to general purpose computing units, wherein an available workflow component is allocated to the general purpose computing unit able to complete the workflow component in the shortest time, wherein the greedy allocation takes into account the distribution variable and the operating system running on the general purpose computing unit.

In another embodiment of the computer implemented method according to the invention, the method is characterized by providing via a graphical user interface a summary of the allocation of workflow components to general purpose computing units, wherein the summary is in particular graphical, wherein the summary is in particular provided as a Gantt chart, wherein the summary is in particular provided after allocation of all workflow components to the general purpose computing units.

In another embodiment of the computer implemented method according to the invention, the first and/or second optimization algorithm take into account a connection graph of the nonempty set of computing units, wherein workflow components which are directly connected in the directed acyclic precedence graph and share information are preferentially allocated to computing units which are physically connected.

In another embodiment of the computer implemented method according to the invention, the method is characterized by allocating at least one workflow component processing sensor data recorded from the at least one physical process to an edge computing unit, wherein the edge computing unit is integrated with the at least one physical process, wherein the at least one workflow component allocated to the edge computing unit is not included in the allocation procedure provided by the methods of any of the preceding claims.

In another embodiment of the computer implemented method according to the invention, at least one workflow component relates to reading and writing from a database, wherein the workflow component uses a database via a database management system (DBMS).

In another embodiment of the computer implemented method according to the some aspects of the invention, at least one workflow component relates to transmitting data between nodes of a computer network using a protocol stack.

In another embodiment of the computer implemented method according to some aspects of the invention, at least one workflow component relates to translating messages of a sender to messages of a receiver, wherein the workflow component uses a message broker.

In another embodiment of computer implemented method according to some aspects of the invention, at least one workflow component relates to providing access to a cloud storage, wherein the workflow component provides logical-to-physical mapping and storage management of the cloud storage.

In another embodiment of the computer implemented method according to some aspects of the invention, the method is characterized by using as first leaf a leaf with the smallest number of nodes having a directed path to the leaf in the directed acyclic precedence graph, and as subsequent leaf a leaf with the smallest number of nodes having a directed path to the leaf in the cropped acyclic precedence graph.

Choosing first and subsequent leaves in the described manner may allow for more parallelism on individual computing units.

BRIEF DESCRIPTION OF THE DRAWINGS

The inventive system is described below in more detail purely by way of example with the aid of concrete exemplary embodiments illustrated schematically in the drawings, further advantages of the invention also being examined Identical elements are labelled with the same reference numerals in the figures. In detail:

FIG. 1 shows a schematic and illustrative depiction of the invention.

DETAILED DESCRIPTION

FIG. 1 shows a schematic and illustrative depiction of the invention. A nonempty set 1 of workflow components 2,2a is given, the workflow components 2,2a partitioning an overall workflow. The workflow components are structured according to a directed acyclic precedence graph which captures dependencies in the execution of workflow components, for the execution of a workflow component may require the previous completion of other workflow components. At least one workflow component 2a receives sensor data as input, the sensor data captured by sensors recording observables of an external physical process. The sensors may record physical variables such as temperature, strain etc. of the external physical process, and the workflow component 2a processes the sensor data. An allocation algorithm implemented on an allocation computing unit 3 uses the directed acyclic precedence graph, the workflow components, knowledge about the hardware configuration of the computing units and knowledge about the operating systems running on the computing units to determine an allocation of workflow components to computing units. The set 4 of computing units comprises different computing units 5, wherein at least two different operating systems run on the set of computing units, wherein any change in a fundamental component of an operating system such as scheduling algorithm, memory management or input/output functionality is considered to provide a different operating system.

The computing units are connected to each other in a fixed topology 6. Some computing units allow bidirectional information transfer between each other, while other pairs of computing units may only allow one-directional information transfer, and other pairs of computing units are not directly connected to one another. The allocation computing unit 3 is able to access 7 all computing units 6 in the set of computing units 4 in a bidirectional manner.

Allocation of workflow components 2,2a onto the set of computing units 4 may proceed as follows:

1) Static analysis techniques may first be used to estimate an individual worst case execution time of a workflow component on a computing unit, wherein a static analysis software may, for example, analyze the machine code and its interaction with the hardware of the computing unit, wherein the machine code corresponds to compiled workflow component source code. Such an estimate is obtained in isolation, i.e. without taking into account the concurrent execution of multiple programs on the computing unit. If, during execution of a workflow component on a computing unit, the executed workflow component needs to wait for external input and latest times for when the external input may arrive are known, then such information may be incorporated into an individual worst case execution time. Multiple programs residing in main memory of a computing unit 5 and waiting to be executed typically increase the individual worst case execution time. The increase in worst case execution time depends on the type of scheduling provided by the operating system and the memory management of the operating system, for example, wherein memory management refers to the management of logical and physical main memory. Using such knowledge, the individual worst case execution time of a workflow component estimated for a computing unit may be modified to take into account the presence of other workflow components on the computing unit competing for parallel execution. For a simple round robin scheduling algorithm, for example, the individual worst case execution time of a workflow component may be multiplied by the number of other workflow components waiting to be executed on the computing unit to obtain an estimate of the worst case execution time of the workflow component. For scheduling algorithms using priorities, for example, the worst case execution time of a workflow component may be determined by inspecting the priority level of the workflow component and the priorities of other workflow components. Similar considerations apply for memory, wherein memory management that requires frequent swapping from a hard disk to main memory and vice versa (e.g. due to a too small main memory or due to suboptimal paging sizes) may be less suitable for workflow components requiring a large amount of memory, in particular if main memory is already largely occupied by data corresponding to different workflow components.

Besides estimating worst case execution times as described above, it may also be possible to estimate execution times dynamically, wherein dynamical analysis techniques are applied to a workflow component being executed on a computing unit. Dynamical analysis techniques may, for example, obtain an execution time of the workflow component being executed on the computing unit. Execution times of multiple workflow components waiting to be executed on the same computing unit may be estimated as well with dynamical analysis techniques. Groups of non-interrupting workflow components may be assigned to one computing unit, for example.

2) Initially, the allocation of workflow components onto the computing units uses knowledge about the individual worst case execution time estimates of each workflow component on each computing unit, and the directed acyclic precedence graph (the graph may be a polytree), knowledge about the first time at which each workflow component can be executed (waiting for external sensor data, for example, may delay a workflow component) and knowledge about the computing unit topology 6. A mixed integer linear program as described by Tompkins may then be used for allocating workflow components to computing units. The workflow assignment provided by e.g. Tompkins' algorithm does not lead to parallel executions of different workflow components on one computing unit. Different workflow components may generally be executed in parallel on the same computing unit if no directed path exists in the directed acyclic precedence graph between the workflow components.

3) Starting from a leaf of the directed acyclic precedence graph, all nodes of the graph that reach the leaf via a directed path are determined. The workflow components corresponding to these nodes are scheduled to be executed by the computing units determined by e.g. the Tompkins' algorithm at the optimized scheduled start times. These nodes as well as edges connected to these nodes are then removed from the directed acyclic precedence graph.

4) The remaining workflow components as well as the cropped directed acyclic precedence graph are then provided as input to e.g. a modified version of Tompkins' algorithm. The worst case execution times of a workflow component on a computing unit are now time-dependent, for some computing units are already occupied at some times. For each of the remaining workflow components, time-dependent worst case execution times are now determined for each computing unit, for example using a combination of individual worst case execution times and knowledge about the operating system on a computing unit and knowledge about the presence of other workflow components on the computing unit. Additionally, workflow components dependent on the completion of a removed workflow component are constrained in time, wherein the execution of the workflow component may only start after completion (determined through worst case execution times) of the removed workflow components on which it depends. A modified version of Tompkins' algorithm may then be solved, for example, the modified version of the mixed integer linear program having time-dependent worst-case execution times and additional time constraints dependent on the removed workflow components.

5) Starting from a leaf of the cropped directed acyclic precedence graph, all nodes of the graph that reach the leaf via a directed path are determined. The workflow components corresponding to these nodes are scheduled to be executed by the computing units determined by e.g. the modified Tompkins' algorithm at the optimized scheduled start times. These nodes as well as edges connected to these nodes are then removed from the cropped directed acyclic precedence graph.

6) The algorithm terminates once the directed acyclic precedence graph is empty.

The overall runtime of the algorithm is a multiple of the runtime of Tompkins' algorithm, wherein the multiplication factor depends on the number of leaf nodes of the directed acyclic precedence graph. Besides (modified) versions of Tompkins' algorithm, any other algorithm may be used in steps 2) and 4) for optimization, in particular algorithms based on the dynamic programming principle or greedy algorithms.

It goes without saying that the illustrated FIGURE is merely a schematic of possible exemplary embodiments.

Although the invention is illustrated above, partly with reference to some preferred embodiments, it must be understood that numerous modifications and combinations of different features of the embodiments can be made. All of these modifications lie within the scope of the appended claims.

What is claimed is:

1. A method for distributing a pre-defined workflow onto a set of at least two general purpose computing units, wherein at least two different operating systems run on the set of general purpose computing units, the workflow comprising a nonempty set of workflow components, the workflow components being ordered in a directed acyclic precedence graph, wherein at least one workflow component of the set of workflow components is used for controlling or monitoring at least one physical process and, for controlling or monitoring the at least one physical process, receives data from sensors recording observables of at least one physical process, wherein the method comprises:
    an allocation computing unit receiving the predefined workflow and a list of the set of general purpose computing units, the list including information about a hardware configuration of each general purpose computing unit, about the operating system running on each general purpose computing unit and about communication connections between the general purpose computing units;
    the allocation computing unit providing a distribution variable which comprises, for each general purpose computing unit, a list of workflow components currently assigned to the general purpose computing unit and the scheduled start time of the currently assigned workflow components;
    the allocation computing unit receiving, from an external computer program product providing static analysis technique functionality, individual worst-case execution times for all combinations between individual workflow components and single computing units;
    the allocation computing unit providing as input to a first optimization algorithm at least the individual worst-case execution times, the directed acyclic precedence graph and the information about communication connections between the general purpose computing units;
    the first optimization algorithm providing for each workflow component a general purpose computing unit and a scheduled time at which computation on the general purpose computing unit starts;
    the allocation computing unit cropping the directed acyclic precedence graph to generate a cropped directed acyclic precedence graph, the cropping comprising, starting with a first leaf of the directed acyclic precedence graph:
        identifying all nodes in the directed acyclic precedence graph with a directed path to the first leaf,
        updating the distribution variable with the workflow components corresponding to the identified nodes and by registering the respective scheduled time, and removing the identified nodes and all edges connected to the identified nodes from the directed acyclic precedence graph;

the allocation computing unit estimating time-dependent worst-case execution times of the remaining workflow components on the general purpose computing units;

the allocation computing unit providing as input to a second optimization algorithm at least the cropped directed acyclic precedence graph, the time-dependent worst-case execution times and the information about communication connections between the general purpose computing units;

the second optimization algorithm providing for each remaining workflow component a general purpose computing unit and a scheduled time at which computation on the general purpose computing unit starts;

the allocation computing unit further cropping the cropped directed acyclic precedence graph, the further cropping comprising, starting with a subsequent leaf of the cropped directed acyclic precedence graph:

finding all nodes in the cropped directed acyclic precedence graph with a directed path to the subsequent leaf, updating the distribution variable with the workflow components corresponding to the identified nodes and by registering the scheduled times, and removing the identified nodes and all edges connected to the identified nodes from the cropped directed acyclic precedence graph; and the allocation computing unit continuing to estimate the time-dependent worst-case execution times until all nodes have been removed from the cropped directed acyclic precedence graph, wherein the updated distribution variable is used to effect execution of the workflow components on the general purpose computing units at the scheduled times, wherein the second optimization algorithm is constrained in that, provided that a workflow component remaining in the cropped directed acyclic precedence graph possesses a directed path in the original directed acyclic precedence graph from a removed node to the node corresponding to the workflow component, the workflow component is only scheduled after completion of all already assigned workflow components having a directed path to the workflow component.

2. The method according to claim 1, wherein modifying the individual worst case execution time of a workflow component on a general purpose computing unit using the information about a number of workflow components already residing in main memory of the general purpose computing unit and a scheduling algorithm of the operating system running on the general purpose computing unit, and multiplying for a round robin scheduling algorithm in particular the individual worst case execution time with the number of workflow components already residing in main memory of the general purpose computing unit to obtain a worst case execution time.

3. The method according to claim 1, wherein the first and second optimization algorithms take into account which of the general purpose computing units are optimized for input/output bound workflow components and which of the general purpose computing units are optimized for central processing unit (CPU) bound workflow components, wherein the worst case execution time of a CPU bound workflow component is larger on a general purpose computing unit with operating system preferring input/output bound workflow components than on a general purpose computing unit with operating system preferring CPU bound workflow components.

4. The method according to claim 1, wherein the first and second optimization algorithms take into account a physical availability of sensor data provided by sensors recording observables of the at least one physical process, wherein the at least one workflow component requiring sensor data is used for controlling or monitoring the at least one physical process, wherein the at least one workflow component is allocated to a general purpose computing unit at the earliest after the sensor data become available.

5. The method according to claim 1, wherein the first or second optimization algorithm is embodied as a mixed integer linear programs, wherein the first or second optimization algorithm is configured to minimize a makespan of workflow provided as input.

6. The method according to claim 1, wherein the first or second optimization algorithm is embodied as an algorithm implementing a dynamic programming principle or as a greedy algorithm distributing workflow components in a greedy fashion to general purpose computing units, wherein an available workflow component is allocated to the general purpose computing unit able to complete the workflow component in the shortest time, wherein a greedy allocation takes into account the distribution variable and the operating system running on the general purpose computing unit.

7. The method according to claim 1, further comprising:
providing via a graphical user interface a summary of an allocation of workflow components to general purpose computing units.

8. The method according to claim 1, wherein the first or second optimization algorithm takes into account a connection graph of the set of computing units, wherein workflow components which are directly connected in the directed acyclic precedence graph and share information are preferentially allocated to computing units which are physically connected.

9. The method according to claim 1, further comprising:
allocating at least one workflow component processing sensor data recorded from the at least one physical process to an edge computing unit, wherein the edge computing unit is integrated with the at least one physical process, wherein the at least one workflow component allocated to the edge computing unit is not included in the allocation procedure provided by the method of claim 1.

10. The method according to claim 1, wherein at least one workflow component relates to reading and writing from a database, wherein the workflow component uses a database via a database management system (DBMS).

11. The method according to claim 1, wherein at least one workflow component relates to transmitting data between nodes of a computer network using a protocol stack.

12. The method according to claim 1, wherein at least one workflow component relates to translating messages of a sender to messages of a receiver, wherein the workflow component uses a message broker.

13. The method according to claim 1, wherein at least one workflow component relates to providing access to a cloud storage, wherein the workflow component provides logical-to-physical mapping and storage management of the cloud storage.

14. The method of claim 1, comprising using as first leaf a leaf with the smallest number of nodes having a directed path to the leaf in the directed acyclic precedence graph, and as subsequent leaf a leaf with the smallest number of nodes having a directed path to the leaf in the cropped acyclic precedence graph.

* * * * *